United States Patent [19]

Robison et al.

[11] Patent Number: 5,638,879

[45] Date of Patent: Jun. 17, 1997

[54] EXTERNALLY CHANGEABLE FLAIL APPARATUS

[75] Inventors: Milan W. Robison, Weidman; Michael J. Cook, Harrison, both of Mich.

[73] Assignee: Wood Technology, Inc., Winn, Mich.

[21] Appl. No.: 514,722

[22] Filed: Aug. 14, 1995

[51] Int. Cl.⁶ .............................. B27L 1/00; F16G 13/06
[52] U.S. Cl. ...................... 144/208.7; 59/87; 59/90; 59/78; 56/12.7; 144/341; 144/343
[58] Field of Search .................... 59/78, 84, 85, 59/86, 87, 90, 93; 144/208.1, 208.7, 341, 343; 56/12.7; 241/191, 193, 189.1

[56] References Cited

U.S. PATENT DOCUMENTS

| Re. 57,740 | 1/1874 | Lamb | 59/85 |
|---|---|---|---|
| 249,177 | 11/1881 | Healey . | |
| 841,164 | 1/1907 | Mattassi | 59/85 |
| 1,258,220 | 3/1918 | Holstrom . | |
| 1,419,112 | 6/1922 | Jones | 59/85 |
| 1,530,940 | 3/1925 | Herman | 59/85 |
| 4,063,583 | 12/1977 | Rieger | 59/85 |
| 4,572,258 | 2/1986 | Mischel . | |
| 4,640,325 | 2/1987 | Vaders . | |
| 4,947,906 | 8/1990 | Schroeder . | |
| 5,148,844 | 9/1992 | Robison . | |
| 5,293,916 | 3/1994 | Kucherry, Sr. . | |
| 5,343,912 | 9/1994 | Chronister et al. | 144/208.7 |
| 5,419,379 | 5/1995 | Schmidt | 144/208.7 |
| 5,511,596 | 4/1996 | Wardell et al. | 144/208.7 |
| 5,535,796 | 7/1996 | Line et al. | 144/208.7 |

FOREIGN PATENT DOCUMENTS 16953 of 1909 United Kingdom ............... 59/85

Primary Examiner—W. Donald Bray
Attorney, Agent, or Firm—Learman & McCulloch

[57] ABSTRACT

Flail apparatus for debarking/delimbing wood products traveling through a debarking station wherein at least one of the flails comprises an axially extending member having axially rotatable chain supporting elements with an array of flexible flailing chains. At least one of the flailing chains incorporates a first, radially extending link, received on one of the elements, which is not radially removable from the element. The flailing chain further incorporates a link structure configured to be radially non-removably attached to the first link. The first link and link structure are configured to permit the link structure to be removable from the first link and a replacement to be received thereon when the link structure is positioned angularly to the said radial direction of extent of the first link.

22 Claims, 3 Drawing Sheets

EXTERNALLY CHANGEABLE FLAIL APPARATUS

This invention relates to flail apparatus useful for debarking and delimbing wood products such as logs, log slabs, and trees.

BACKGROUND OF THE INVENTION

Flailing machinery for removing limbs and bark prior to introducing the wood product to a chipper for chipping the wood product into useable chips which can be used in the paper industry to make pulp has become increasingly popular in recent years. Machinery of this character, wherein flail drum systems have been employed to flail the log or tree proceeding through a flailing station are disclosed in U.S. Pat. Nos. 5,148,844 and 5,322,104, both of which are incorporated herein by reference. Flail drum systems of this type typically may have an upper rotary chain flail drum and a lower rotary chain flail drum disposed on opposite sides of a log or other wood product being moved forwardly longitudinally between the upper and lower flail drums. The upper and lower flail drums are each driven in rotation about a generally horizontal axis transverse to the path of the log. Typically, these flail drums include a central shaft, with axially spaced spacer elements thereon providing perimetrical openings through which chain supporting rods freely extend, alternately with circumferentially spaced openings through which the rods extend and which support the rods. The inner links of the chains then are supported on the rods in typically an axially progressive spiral array.

As these patents point out, and, as is well known in the art, flailing chains wear relatively rapidly and must be removed and replaced as a matter of course. When the chains are being replaced, the machine is down and cannot be used. Prior systems have focused on providing drums which can be readily disassembled in order to achieve chain replacement.

The present invention is directed to a system of improved character wherein the chain flails can be externally replaced in the sense that disassembly of the drums involved is not necessary.

SUMMARY OF THE INVENTION

The present flail chain system, by way of concept, incorporates a first link which is supported by one of the axially extending members or support rods which are carried by the rotating flail drum. This first radially extending link, which is used to support each individual chain, is not radially removable from its support rod inasmuch as the rod extends through an opening provided in the first link. The flailing chain of the invention, however, further incorporates a link structure which cooperates with the first link such as to be radially non-removably attached to it and to extend radially from it under the centrifugal force of operative rotation of the drum. The first link and link structure are relatively configured to permit the link structure to be removable from the first link only when the link structure is positioned angularly to the radial direction of extent of the first link and is manipulated to move past a barrier wall structure which maintains the chain in assembled relation during operation of the flail drum.

More specifically, the first link incorporates an attachment hook member extending generally laterally to the radial direction of extent of the first link which terminates in an upturned terminal end, and the terminal end of the hook has a wall normally blocking removal of the link structure from the first link. The link structure incorporates a second link which is received on the terminal end of the hook and is positively prevented from sliding off the terminal end of the hook when the links of the chain are radially aligned with the first link during operation of the flail drum structure. The link structure also includes a third link linked to the second link, and both the second and third links have a general elliptical opening with a major and minor direction of extent. Provided on the terminal end of the hook, is a side recess in which a portion of the third link can be received when the second and third links are turned generally perpendicularly to the radial extent of the first link to permit the second link to move radially inwardly relative to the hook terminal end sufficiently to permit the second link to clear the wall and slide off the terminal end of the hook for chain replacement purposes. In order to be removable from the hook, the link structure must be oriented laterally out of the normal radial line of extension which it assumes under the operation of centrifugal force, and then the link structure must be moved radially inwardly relative to the first link in a direction opposed to that centrifugal force in order for separation to occur. This manipulation, required to produce separation, is not one remotely expected to occur during the operation of the flail drums in the flailing operation. In tests conducted, the flailing chain system of the invention has proven eminently successful.

One of the prime objects of the invention is to provide a flail system in which the chain elements can be externally changed and replaced without the need for dismantling the flail drums which support the chains and incurring the additional downtime which, accordingly, results. It is estimated that, with the present system, up to 80% of the normally encountered downtime can be eliminated.

Another object of the invention is to provide a flail system wherein one man, without the use of tools, can selectively rapidly change one or all of the chains.

Still a further object of the invention is to provide a link chain structure which, at each end, incorporates standard links so that the chain wear problem can be resolved, in many instances, by simply reversing the chain part removed and using the end link which has become work hardened in the flailing operation as the link which attaches to the hook link.

A further object of the invention is to provide a flail link structure which is strong and durable and economical to manufacture, as well.

Other objects and advantages of the invention will become apparent with reference to the accompanying drawings and the accompanying descriptive matter.

THE DRAWINGS

The presently preferred embodiment of the invention is disclosed in the following description and in the accompanying drawings, wherein.

DETAILED DESCRIPTION

Figure 1:
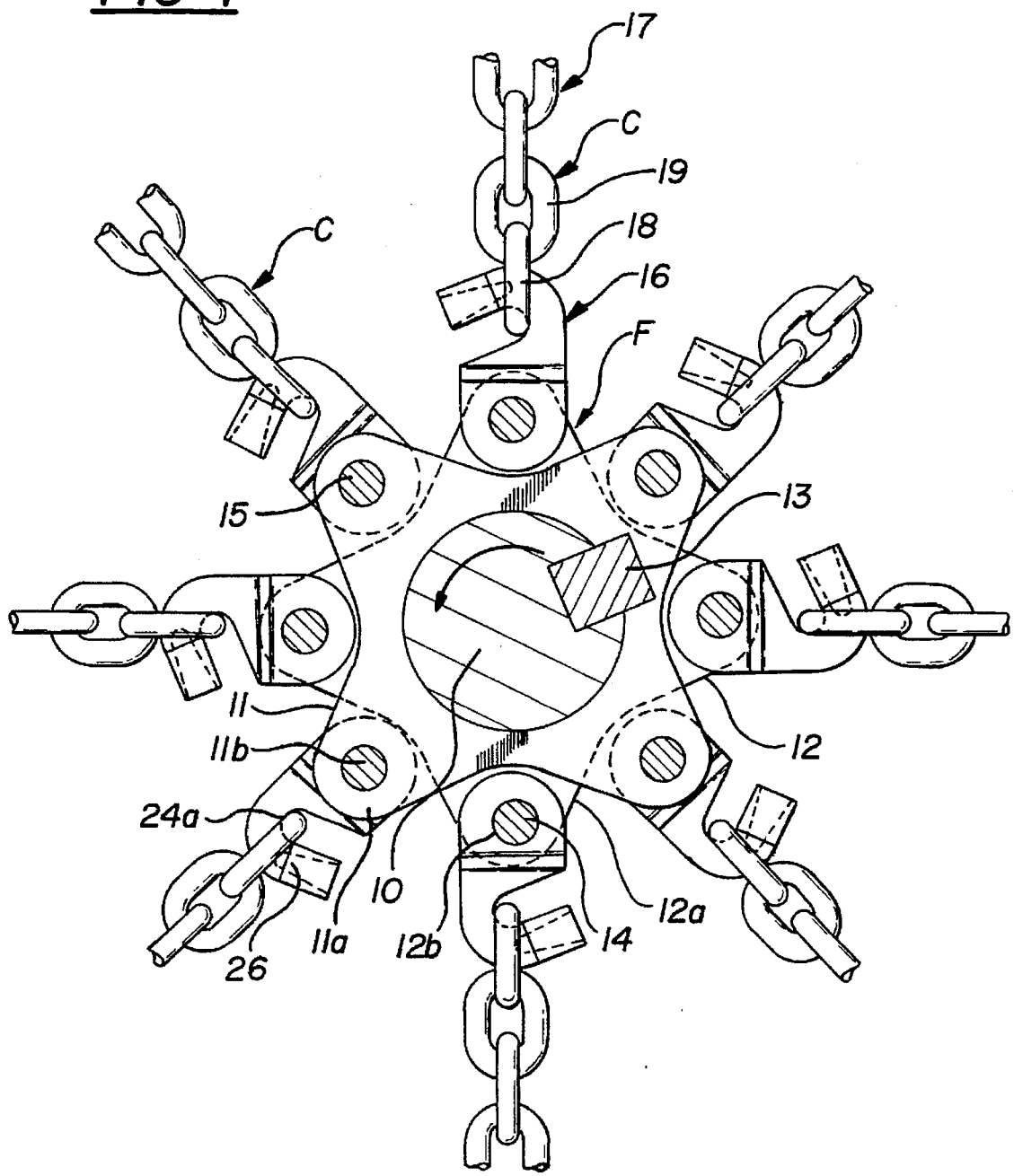
FIG. 1 is a cross-sectional view taken through a flail drum which incorporates the chain structure to be disclosed, the ends of the chains being broken away in the interest of clarity.
Figure 2:
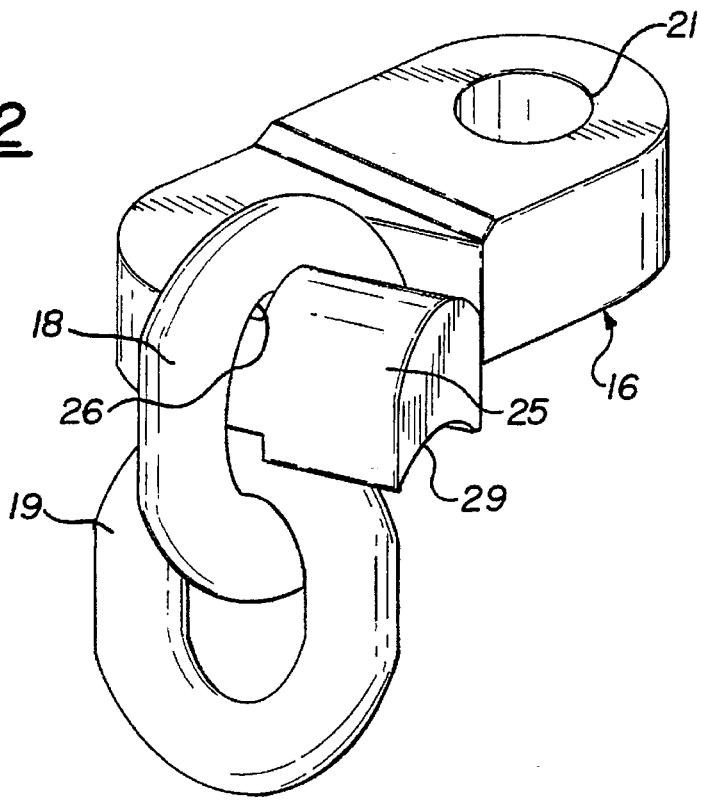
FIG. 2 is a fragmentary perspective view on a greatly enlarged scale, with a first attachment link lying on its side ready for detachment of the remaining link structure.

Referring now more particularly to the accompanying drawings, and in the first instance to FIG. 1, the flail drum shaft 10, which is connected with a rotary drive in the manner indicated in the patents referenced herein is connected with circumferentially staggered, scalloped spacer and rod support disk elements 11 and 12 along its axis by means of a key 13. The axially extending series of disks 11 and 12 include lobe portions 11a and 12a, respectively, within which openings 11b and 12b are respectively provided to respectively receive chain support rods 14 and 15. Other than as shown and described, the flail drum structure may be of the character disclosed in U.S. Pat. No. 5,322,104 and include removable end members to permit disassembly of the flail drum.

Supported on the rods 14 and 15 are flexible flail chains, generally designated C, which may be arranged in the manner disclosed in the aforementioned patent on the rods 14 and 15, or arranged otherwise as desired. Since the chains C are identical, a description of one will suffice for all. Each of the chains C includes a first rod attachment link, generally designated 16, to which a remaining chain part or link structure, generally designated 17, is releasably secured. It is important to understand that the link structures 17 may be conventional link chain lengths or parts of the type depicted in the aforementioned patent.

As will become apparent from further describing the rugged steel links of the chain, the broad concept of the invention involves having a relative configuration of the link structure or drum part 17, which incorporates second and third links 18 and 19, and the first link 16, such as to block removal of the second link 18 from the first link 16 when the first, second, and third links are in radial alignment, but permit removal of the second link 18 from the first link 16 when the second and third links are turned relatively angularly to the first link 16 and the second and third links 18 and 19 are moved radially inwardly relative to the first link 16. One configuration of the various parts which will positively restrain chain separation when the flail drum is in operation, is disclosed in FIGS. 2-6, but it is not intended that the invention be limited to the embodiment described in the drawings.

Figure 4:
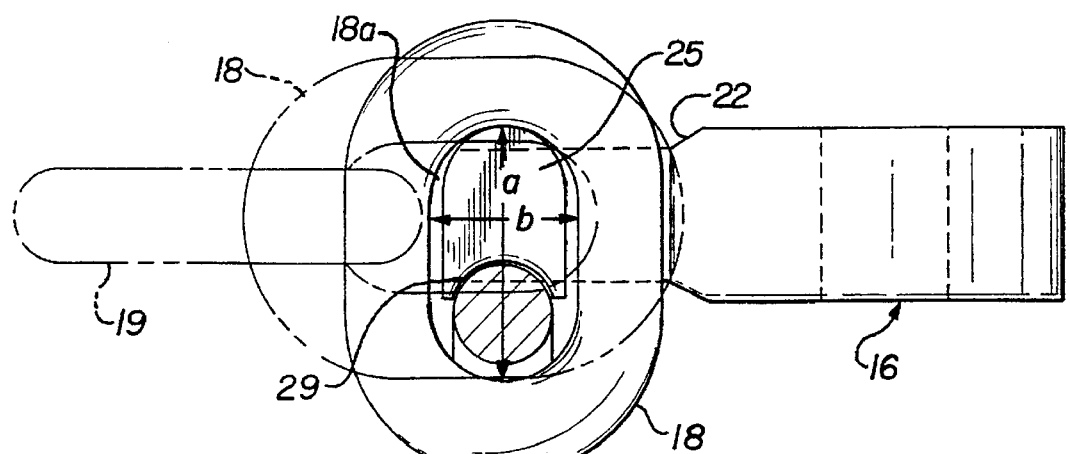
FIG. 4 is an end view of the link taken in the FIG. 2 position, the chain lines indicating the normal operating position of the links.
Figure 5:
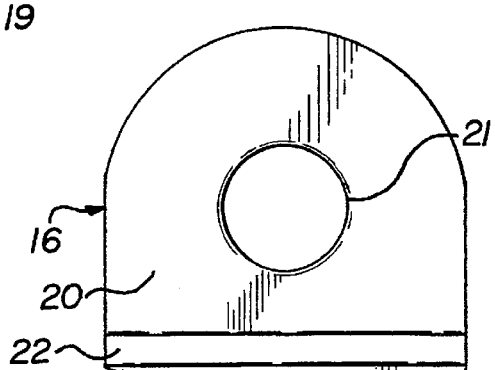
FIG. 5 is a side elevational view of the first or attachment link.
Figure 6:
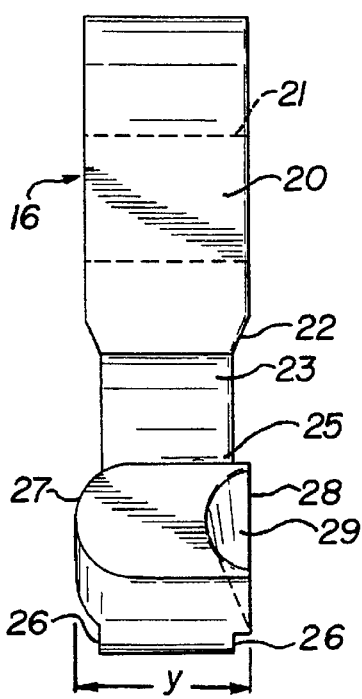
FIG. 6 is an end elevational view thereof.

As FIGS. 4-6 particularly indicate, the first link 16 of each chain C includes a head or shank part 20 with an opening 21 therethrough to which the rod 14 or 15, as the case may be, is adapted to extend. It is to be understood that the chain C is flexible between its articulated links and the attachment link 16 is rotatable to a limited extent on its rod 14 or 15. The head part 20 of the first link 16 connects integrally, via a convergent neck part or portion 22, with a hook part or portion 23 which has a laterally extending recess 24 defining a laterally extending upturned hook terminal end portion 25.

It will be observed that the hook end portion 25 is shouldered on both sides as at 26. Further, one side wall of the hook end 25 is curvilinear, as shown at 27, whereas the other is flat, as at 28. The flat side 28 incorporates an elongate recess or groove 29 of a convergent nature which is of greater depth at its entrance end 29a than its inner end 29b and decreases uniformly, indepth from end 29a to the end 29b.

The lateral and radial dimensions of the hook end 25 also correlate to operate with the links 17 and 18 in the disassembly and assembly operations, as will presently be explained. It will be noted that the links of the chain, and this includes links 18 and 19, are elongate links which have openings of elliptical shape with a major axis "a" and a minor axis "b". The links are of circular cross section throughout. When the links 18 and 19 are in a position of radial alignment with the link 16, as illustrated by the chain lines in FIG. 4, the cross sectional volume of the link 19, plus the generally radial thickness of the hook end 25, as demonstrated at x, substantially fill the opening 18a provided in the link 18 in the major axis direction and prevent any disengagement of the link 18 from the hook end 25. In this position of the parts, link 18 is trapped behind the shoulder 26 in the manner illustrated in FIG. 2. Normally, in the course of operation, the centrifugal force developed by the chains C, with rotation of flail shaft 10, keeps the links 16, 18, and 19 in radial alignment. Because the ends of the chains C beat against the wood products in the flailing operation, however, the chains are subject to twisting and rebound forces and the system described provides a relative configuration which prevents their disengagement in use. It will be noted that the width of the end 25 at "y" is such as to fill the link opening 18a in the minor axis direction "b". In radial disposition, the links 16, 18, and 19 then are positively retained.

Typically, the most persistent wear is encountered on the second chain link 18 and offtimes it is merely necessary to remove the chain part 17 from the link 16, turn it end for end, and replace it on the link 16. This may be accomplished in the manner disclosed particularly in FIGS. 2-4. The first step in the process involves turning the links 16-19 relatively such that the links 18 and 19 are disposed angularly with respect to the radial extent of link 16, in the manner shown in FIGS. 2 and 4. In this position of the links 18 and 19, they have been reoriented 90° so that their major axes "a" align with the dimension "y" of the hook end 25. In this position, the link 18 is still prevented from removal off the end of 25 by the shoulder 26, as shown in FIG. 10. If, however, the link 19 is moved upwardly into the recess 29 in the manner indicated in FIGS. 3 and 4, the link 18 can be moved radially inwardly to just clear the shoulder 26, and the link 18 can be slid off the end 25 of hook 23.

Figure 3:
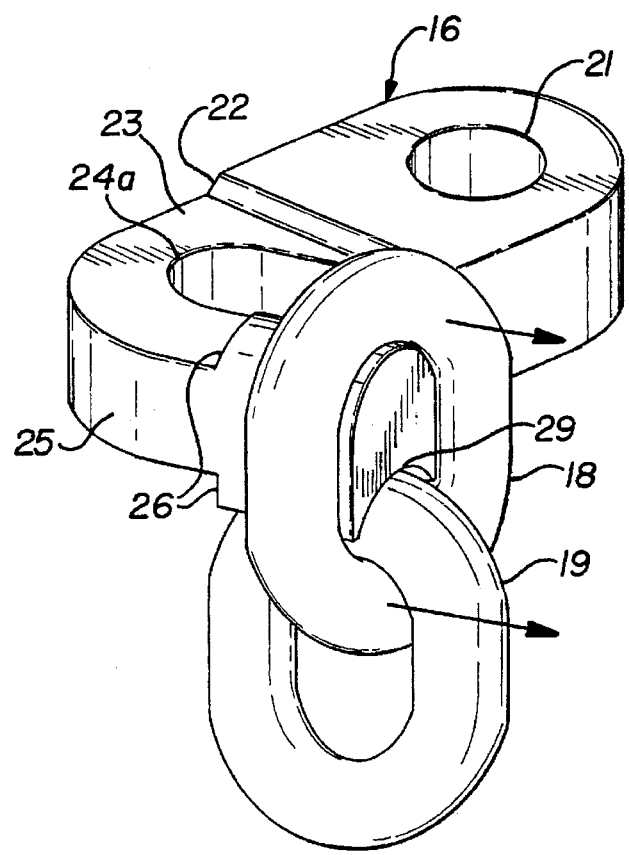
FIG. 3 is a similar view illustrating a further position of the component parts during the chain disassembly operation wherein the remaining link structure is manipulated to withdraw it from the attachment link.

Assuming the terminal end link of the chain is not damaged or worn, but merely work hardened by its repeated contact with the wood product, the chain part 17 may be simply turned end for end and reinstalled on the hook end 25. This is, of course, accomplished by disposing the links 18 and 19 on the end 25, as shown in FIG. 3, and moving the links 18 and 19 inwardly relatively to link 16 until the link 18 clears the shoulder 26 and assumes the FIG. 2 position. The chain part or link structure 17 can then be returned to radial alignment with the link 16 manually, or will assume this position under the operation of centrifugal force when the shaft 10 is rotated. When the chain part 17 is fully damaged or worn, replacement of a new chain part 17 can, of course, be readily accomplished in the manner described.

THE OPERATION

With particular reference to FIG. 1, the shaft 10 is rotated in the direction in which the hook ends 25 face. In this rotation, the end surfaces 24a provide fulcrumming and impact absorbing surfaces and the shoulders 26 and hook surfaces 24a provide load bearing stop walls for load absorbing and load resisting purposes. Movement of the chains in pivoting motion about the curvilinear bearing surfaces 24a is restrained upwardly by the surfaces 22 and downwardly by the shoulder surfaces 26.

The disclosed embodiment is representative of a presently preferred form of the invention, but is intended to be illustrative rather than definitive thereof. The invention is defined in the claims.

I claim:

1. Flail apparatus useful for debarking wood products such as logs as the logs travel through a debarking station having opposed rotating flails positioned to engage opposed sides of the log, at least one of said flails comprising:
    a) an axially extending flail member having axially extending rotatable chain supporting elements;
    b) an array of flexible flailing chains on said elements;
    c) at least one of said flailing chains comprising a first, radially extending link, received by an element, and which is not radially removable from said element;
    d) said one flailing chain further incorporating a link structure configured to be radially non-removably attached to said first link and to extend radially therefrom under the centrifugal force of operative rotation, said first link and link structure being configured to permit said link structure to be removable from said first link when said link structure is positioned angularly to the said radial direction of extent of said first link;
    e) said first link comprising a shank portion with an opening through which a chain supporting element extends, and incorporating an attachment hook member extending generally laterally to the radial direction of extent of said shank portion and terminating in an upturned terminal end.

2. The apparatus of claim 1 wherein said link structure includes a substantially closed second link received on said hook and said hook on the terminal end thereof has a wall normally blocking removal of said substantially closed link from said hook.

3. The apparatus of claim 2 wherein said wall comprises a transversely disposed shoulder on said hook terminal end normally blocking said substantially closed second link from sliding off said terminal end of the hook when said substantially closed link is oriented laterally relative to said first link.

4. The apparatus of claim 2 wherein said link structure includes a third link linked to said second link and both said second and third links have a generally elliptical opening with a major and a minor direction of extent, and said second and third links, in operation under the influence of centrifugal force, assume a position in which said major axis of each is disposed radially in line with said first link, said hook and third link having a cross-sectional area generally filling said second link opening in its major axis direction to block disengagement of said second link from said hook.

5. The apparatus of claim 4 wherein said hook terminal end, on a lateral side thereof relative to the radial extent of said first link, has a shoulder comprising said wall normally blocking removal of said second link off said hook terminal end when said second link is turned generally perpendicularly to said first link to dispose said minor axis of the opening in said second link in alignment with said hook end.

6. The apparatus of claim 5 wherein said hook terminal end laterally opposite said shoulder has a recess in which a portion of said third link can be received when the second and third links are turned generally perpendicularly to the radial extent of said first link, to permit said second link to move radially inwardly relative to said hook terminal end and shoulder sufficiently to permit said second link to clear said shoulder and slide off the terminal end of said hook.

7. The apparatus of claim 1 wherein a second link having an opening therethrough is received on said hook end, and a third link having an opening therethrough and oriented perpendicularly to said second link is linked to said second link, said hook terminal end and second and third link having a relative configuration such as to block removal of said second link from said hook terminal end when the first, second and third links are in radial alignment but permit removal of said second link from said hook terminal end when the second and third links are turned relatively angularly to said first link and the second and third links are moved radially inwardly relative to said first link.

8. The apparatus of claim 7 wherein said relative configuration includes a blocking wall for said second link preventing it from being slid off said terminal end of the hook, and a recess permitting said third link to be moved radially inwardly relative to said first link and hook terminal end to free said second link for conjoint radial inward movement to clear said blocking wall.

9. A method of removing a flexible flail link chain part from an axially extending, rotatable flail member having an axially extending chain support element, the chain comprising a first link, secured at its inner end to said rotatable chain support element, and having a generally laterally extending hook at its radially outer end terminating in a hook terminal end, the chain part having a second link received over the hook terminal end and a third link linked to said second link in a perpendicular orientation thereto, said second link being blocked from moving off the terminal end of said hook when the second and third links are in radial alignment with said first hook and separable from said hook terminal end only when said second and third links are reoriented angularly relative to said radially extending first link and said second and third links are moved radially inwardly relative to said first link, the steps of:
    a) angularly reorienting said second and third links from radial alignment with said first link to generally align with said terminal end of the hook;
    b) moving said second and third links relatively to said hook end in a generally radially inward direction to free said second link to move off the hook; and
    c) removing said second link from the terminal end of said hook.

10. The method of claim 9 wherein a replacement chain part having second and third links of the same configuration is replaced on said first hook by orienting said second and third links laterally relative to the radial extent of the replacement chain opposite the terminal end of said hook, said third link is moved radially to the hook to free said second link to move radially inwardly, said second link is moved radially inwardly and then laterally over the terminal end of said hook; and said second and third links are realigned to extend in radial alignment with said first link.

11. The method of claim 10 wherein said chain support is rotated to maintain said links flexibly connected in generally radial alignment by centrifugal force.

12. The method of claim 9 wherein said second link is normally blocked from moving off the terminal end of said hook by a barrier wall and radial inward movement of said second and third links enable said second link to move radially clear of said wall.

13. A flailing chain for use in a flail machine for debarking logs as the logs travel through a debarking station wherein a rotatable flail drum has an axially extending member with an axially extending chain supporting element for supporting a series of flexible flailing chains on said element; said flailing chain comprising:
    a) a first, radially extending link adapted to be received by said element and which is not radially removable from said element;

b) a link structure configured to be radially non-removably attached to said first link to extend radially therefrom under the centrifugal force of operative rotation, said first link and link structure being configured to permit said link structure to be removable from said first link when said link structure is positioned angularly to the said radial direction of extent of said first link and moved radially inwardly relative to said first link; and e) said first link comprising a portion with an opening through which said chain supporting element can extend and incorporating an attachment hook member extending generally laterally to the radial direction of extent of said first link and terminating in an upturned terminal end, said link structure including a second link received on said hook inward of said terminal end thereof and said hook on the terminal end thereof having a wall normally blocking removal of said second link from said hook.

14. The apparatus of claim 13 wherein said wall comprises a transversely disposed shoulder normally blocking said second link from sliding off said terminal end of the hook when said second link is turned laterally relative to said first link, said chain including a third link linked with the second link, both said second and third links having a generally elliptical opening with a major and a minor direction of extent, and said second and third links, in operation under the influence of centrifugal force assuring a position in which said major axis of each is disposed radially in line with said first link, said hook and third link having a cross-sectional area generally filling said second link opening in the major axis direction to block disengagement of said second link from said hook.

15. The apparatus of claim 14 wherein said hook terminal end, on a lateral side thereof relative to the radial extent of said first link, has a shoulder surface normally blocking removal of said second link off said hook terminal end when said second link is turned generally perpendicularly to said first link to dispose said minor axis of the opening in said second link in radial alignment with said first link, and said hook terminal end laterally opposite said shoulder surface has a recess in which a portion of said third link can be received when the second and third links are turned generally perpendicularly to the radial extent of said first link, to permit said second link to move radially inwardly relative to said hook terminal end and shoulder surface sufficiently to permit said second link to clear said shoulder surface and slide off the terminal end of said hook.

16. The apparatus of claim 13 wherein said link structure includes a second link having an opening therethrough which is received on said hook, and a third link having an opening therethrough and oriented perpendicularly to said second link is linked to said second link, said hook terminal end and second and third link having a relative configuration so as to block removal of said second link from said hook terminal end when the first, second, and third links are in radial alignment but permit removal of said second link from said hook terminal end when the second and third links are turned relatively angularly to said first link and the second and third links are moved radially inwardly relative to said first link.

17. The apparatus of claim 16 wherein said relative configuration includes a blocking wall for said second link preventing it from being slid off said terminal end of the hook and a recess permitting said third link to be moved radially inwardly relative to said first link and hook terminal end to free said second link for radial inward movement to clear said blocking wall.

18. A method of making a flexible flail link chain for an axially extending rotatable flail chain member having a chain support element, comprising the steps of: providing a first link adapted to be secured at its inner end to said rotatable chain support element and having a generally laterally extending hook at its radial outer end terminating in a hook terminal end, providing a chain part having a second link received over the hook terminal end and a third link linked to said second link in a perpendicular orientation thereto, providing said hook end with a wall blocking said second link from moving off the terminal end of said hook when the Second and third links are in radial alignment with said first hook and configuring said hook end such that said second link is separable from said hook terminal end only when said second and third links are reoriented angularly relative to said radially extending first link and said second and third links are moved radially inwardly relative to said first link.

19. For use in a flail machine for debarking logs and log parts as the logs and log parts travel through a debarking station wherein a rotatable flail has a series of chain support elements connected thereto for supporting a series of axially spaced flailing chains on the flail, a flailing chain comprising:

a) a first radially extending link adapted to be received by said element and which is not readily removable from said element;

b) a link structure configured to be radially non-removably attached to said first link to extend radially therefrom under the centrifugal force of operative rotation;

c) said link structure having a second link with an opening therethrough received on said hook end, and a third link having an opening therethrough and oriented perpendicularly to said second link linked to said second link, said hook terminal end and second and third link having a relative configuration such as to block removal of said second link from said hook terminal end when the first, second and third links are in radial alignment but permit removal of said second link from said hook terminal end when the second and third links are turned relatively angularly to said first link and the second and third links are moved radially inwardly relative to said first link.

20. The flailing chain of claim 19 wherein said relative configuration includes a blocking wall for said second link preventing it from being slid off said terminal end of the hook, and a recess permitting said third link to be moved radially inwardly relative to said first link and hook terminal end to free said second link for conjoint radial inward movement to clear said blocking wall.

21. The flailing chain of claim 19 in combination with said axially extending flail as one of an array of flexible flailing chains, and including a drive for rotating said axially extending flail to normally maintain said links flexibly connected in generally radial alignment by centrifugal force.

22. The flailing chain of claim 19 wherein both said second and third links have a generally elliptical opening with a major and a minor direction of extent, said second and third links in operation under the influence of centrifugal force assume a position in which said major axis of each is disposed radially, and said hook and third link having a cross sectional area generally filling said second link opening in its major axis direction to normally block disengagement of said second link from said hook, said second link being removable from said hook when it is turned generally perpendicularly to said first link to dispose said minor axis of the opening in said second link in alignment with said hook end.

* * * * *